3,098,095
PROCESS FOR RESOLVING AROMATIC POLYCAR-
BOXYLIC ACIDS CAPABLE OF FORMING IN-
TRAMOLECULAR ANHYDRIDES
James O. Knobloch, Hobart, and John W. Shepard, Griffith, Ind., and Hsiang P. Liao, Park Forest, Ill., assignors to Standard Oil Company, Chicago, Ill., a corporation of Indiana
No Drawing. Filed Aug. 10, 1959, Ser. No. 832,866
6 Claims. (Cl. 260—525)

This invention relates to the resolution of mixtures of certain aromatic acids. More particularly, it provides a method of separating aromatic acids from mixtures thereof wherein the individual acids may possess closely similar physical and chemical properties.

In recent years, numerous aromatic acids have taken on considerable importance as chemical raw materials and intermediates. Much importance has recently been given to this development by the discoveries of exceedingly convenient processes for preparing such acids by oxidizing appropriate feedstocks. Unfortunately, many readily available feedstocks, particularly those derived from petroleum sources, contain mixtures of isomeric and homologous aromatic compounds, and correspondingly the resultant aromatic acids are mixtures of different aromatic acids. Even the relatively simple oxidation of mixed petroleum xylenes leads to four different aromatic acids, and the patent and scientific literature is replete with attempts to resolve this apparently simple acid mixture.

The problem of resolving aromatic acids becomes much more acute when the aromatic acids have additional substituents on the aromatic nucleus. These acids are encountered when an oxidation feedstock, or the resulting aromatic acid product, is chemically treated to introduce substituents such as nitro, chloro, or sulfonate ester groups on the ring. The number of position isomers and homologs of aromatic acids having additional substituents on the nucleus is astronomical.

Our invention relates to the separation of mixtures of aromatic acids wherein two or more of the acids have at least two carboxylic acid groups which are sterically capable of forming an intramolecular anhydride, and one or both of these aromatic acids has at least one additional substituent on the benzene nucleus. Our invention is based in part on the discovery that these aromatic acids, despite the frequent chemical and physical similarity between such acids, possess characteristically different temperatures at which the carboxyl groups will dehydrate to form the corresponding aromatic acid anhydride.

Therefore, in accordance with the invention, a method is provided for resolving a mixture of at least two aromatic acids wherein each of the acids is sterically capable of forming an intramolecular anhydride and one or both of the acids has at least one additional nuclear substituent (other than hydrogen). These aromatic acids may form an anhydride by the dehydration of adjacent (ortho) carboxylic acid groups or, in the case of polynuclear aromatic acids, such as naphthalene 1-8 dicarboxylic acid, through the dehydration of two alpha carboxyl groups. Resolution of aromatic acids in accordance with the invention is effected by heating the mixture of acids to a temperature intermediate of the individual characteristic dehydration temperatures for a period of time sufficient to dehydrate predominantly only one of the aromatic acids, i.e. that the acid having the lower dehydration temperature, while minimizing dehydration of the other of said aromatic acids, and thereafter physically separating a fraction enriched in the aromatic acid anhydride from a fraction enriched in the other aromatic acid. This latter separation can be effected quite readily since the physical properties of aromatic acid anhydrides are markedly different from those of the corresponding acid or of other closely related acids. Hence, the anhydride-rich fraction can be separated by well known physical separation procedures, such as solvent extraction, vacuum distillation, or melting of the anhydride and physical separation of the molten anhydride from the solid acids.

It has further been discovered in accordance with the invention that the selective dehydration of one aromatic acid in the presence of another is conveniently effected in the presence of a liquid medium which is immiscible with water at the dehydration temperature. This liquid should be substantially inert to the carboxyl group and to any additional substituents in the aromatic acid; in other words, it should not interfere with the separation or deleteriously affect the quality of the resultant individual acids. Such liquids as the hydrocarbons of the paraffinic, naphthenic or aromatic series have been found most suitable for the present purpose, particularly if the hydrocarbon has a boiling point within the range of about 100–200° C. Such hydrocarbons as the octanes, the nonanes, the alkyl cyclohexanes such as n-octyl cyclohexane and especially the aromatic hydrocarbons such as toluene, the xylenes, cumene, mesitylene, pseudocumene, and the cymenes, and various mixtures with each other are suitable herein. Other materials such as ketones, aldehydes, halohydrocarbons, etc., may also be used.

An extremely wide variety of aromatic acids may be resolved in accordance with the inventive process. It is only necessary for the purposes herein that there be at least two acids in the mixture which are sterically capable of forming intramolecular anhydrides and which, by reason of their having additional nuclear substituents, have characteristically different dehydration temperatures. Other aromatic acids may be present in the mixture and are separated if their properties differ from those of the anhydride or the non-dehydrated acid, depending on their individual physical properties such as solubility. Thus, derivatives of orthophthalic acid having one or more substituents in the 3, 4, 5 and/or 6 positions may readily be separated. For example, separations can be made involving unsubstituted orthophthalic acid, 3-methyl orthophthalic acid, 4-methyl orthophthalic acid, 3,6-dimethyl orthophthalic acid, 4-t-butyl orthophthalic acid, 3-nitro orthophthalic acid, tetrabromo orthophthalic acid, tetrachloro orthophthalic acid, 3-chloro orthophthalic acid, and 4-carboxy orthophthalic acid (trimellitic acid). Other orthophthalic acids having fluoro, iodo, hydroxy, alkoxy, ester, amino, sulfonate ester, etc., groups, may be similarly treated. In some instances it may be desirable to protect those functional groups which are reactive with anhydride groups, e.g. acetylation of amino groups or methylation of hydroxy groups.

The temperature at which an individual aromatic acid will dehydrate to its anhydride can readily be determined by those skilled in the art. A convenient way to make such determination is to place a small amount of an individual aromatic acid in a glass test tube which is positioned in a high boiling hydrocarbon or silicone oil bath. A thermometer is placed either in the test tube or in the bath. The oil is then slowly heated, and observations are made of the bath or acid temperature at which water, evolved as acid dehydrates to the anhydride, first condenses in the cool exposed portion of the test tube. Heating is continued until rapid evolution of water occurs; this temperature is also noted. It is generally but not invariably found that a small amount of water begins to condense at a temperature of 5–30° C. below the temperature at which fairly rapid evolution and condensation begins. This test is repeated with the second component of the mixture, and again the temperature at which initial and rapid evolution of water begin are taken. If the rapid evolution temperatures differ by more than about 5° C., and there is not too extensive an overlap between the initial and rapid dehydration temperatures of one acid and those of the other, then separation can be effected by the inventive process. The farther apart the two characteristic rapid dehydration temperatures are, and the narrower the spread between the initial dehydration temperature and the rapid dehydration temperature of each acid, then the easier can the separation be effected.

When heating the mixture of aromatic acids to effect selective dehydration of one acid, it is preferred that the substantially inert water-immiscible liquid which may be employed to facilitate dehydration be one which refluxes near the dehydration temperature which is appropriate for selective dehydration. Refluxing not only simplifies the problem of accurate temperature control, but assists in dehydration as the water that boils with the inert liquid may be separated before the condensed inert liquid is returned to the vessel under reflux. For mononuclear aromatic acids, the aromatic hydrocarbons are frequently suitable for this purpose. Toluene, for example, boils above the rapid decomposition temperature of tertiary butyl orthophthalic acid at atmospheric pressure, while the xylenes are useful in dehydrating 4-nitro or 3- and 4-chloro orthophthalic acids, and the cymenes will boil above the rapid dehydration temperature of 4-methylphthalic acid but below that of o-phthalic acid.

Heating of the mixed acids may be effected in any suitable apparatus operated either batchwise, continuously, or intermittently. Heating may take anywhere from five minutes to five hours or more, and can be quite rapid where the two acids have widely differing dehydration temperatures.

Once the mixture of aromatic acids has been heated for a sufficient time to dehydrate the desired amount of the first aromatic acid (usually 25–95%), while minimizing the dehydration of the second acid by remaining below its dehydration temperature, the anhydride is ready for separation from the remaining acid. Separation is conveniently effected since anhydrides have markedly different properties from the properties of even the parent acid. Thus, solvent extraction, distillation at subatmospheric pressure, or melting of the anhydride and physical separation from the remaining acid by filtration, etc., may be employed for effecting the actual physical separation.

It is preferred to extract the anhydride from the mixture of acids with an aromatic hydrocarbon solvent. Aromatic hydrocarbons which boil up to about 200° C. have a special selectivity for aromatic anhydrides over the acids, and often will dissolve more than 100 times the amount of the anhydride as the acid. Thus, solvent extraction with an aromatic hydrocarbon such as toluene, xylenes, cumenes or cymenes and the like represents the preferred embodiment of the separation procedure. Furthermore, these same extraction liquids, or a portion thereof, may also be utilized as the water-immiscible liquid employed for effecting selective dehydration.

Selective extraction thus separates a fraction enriched in the anhydride from a raffinate enriched in the undehydrated aromatic acid components. The extract may be treated for recovery and purification of the anhydride by distillation of the solvent or by cooling the crystallization, etc.

Similarly, when separation is effected by vacuum distillation or by filtration, etc., a distillate or filtrate fraction enriched in the anhydride is separated from a fraction enriched in undehydrated acid. In these separation modes, the individual fractions are recovered directly in the separation step and require no further treatment except where imposed by additional purity requirements.

The invention will be more clearly understood by reference to a series of examples to be presented herein. Previous to this however, the following illustrative table is presented which gives the results of a series of tests made to determine the characteristic dehydration temperatures of several aromatic acids. The precise temperatures will vary with the skill of the analyst, and hence the temperatures below should only be considered as order-of-magnitude estimates. These tests were made in accordance with the procedure previously suggested.

DEHYDRATION TEMPERATURE OF AROMATIC ACIDS

| Aromatic Acid | Initial Dehydration, ° C. | Rapid Dehydration, ° C. |
|---|---|---|
| Orthophthalic acid | | 190 |
| 4-methyl orthophthalic acid | 115 | 140 |
| 3,6-dimethyl orthophthalic acid | 105 | 105 |
| 4-t-butyl orthophthalic acid | | 111 |
| 3-nitro orthophthalic acid | 160 | 180 |
| 4-nitro orthophthalic acid | 130 | 160 |
| Tetrabromo orthophthalic acid | 115 | 130 |
| Tetrachloro orthophthalic acid | 110 | 155 |
| 3-chloro orthophthalic acid | [1] 130 | [1] 130 |
| 4-chloro orthophthalic acid | [1] 130 | [1] 130 |
| 4-carboxy orthophthalic acid | 215 | 220 |

[1] Approximate.

Example I

The nitration of orthophthalic acid gives a mixture of 3-nitro and 4-nitro orthophthalic acids. A mixture of 1.8 grams of 3-nitro orthophthalic acids and 1.8 grams of 4-nitro orthophthalic acid, together with 180 ml. of dry mixed petroleum xylenes (B.R. 136–144° C.), is placed in a 500 ml. flask and refluxed at atmospheric pressure for two hours, using a water trap in the reflux condenser. At the end of this time, the mixture is cooled to about 25° C. and filtered through a cellulosic filter medium. Since each of the anhydrides are soluble to the extent of at least 10 g./100 g. xylene at 25° C., but less than about 0.01 gram of the acids are soluble (per 100 g. xylene), xylene is an excellent separating agent. Accordingly, the filtrate contains 1.27 grams of 4-nitro orthophthalic acid anhydride and only 0.11 gram of the 3-nitro orthophthalic acid anhydride. Thus an excellent separation of acids which are position isomers of each other has been realized.

Example II

The chlorination of either orthoxylene or orthophthalic acid gives a mixture of 3 and 4-substituted isomers, together with unchlorinated aromatic compound. A mixture of 5 grams of mixed 3 and 4-chloro orthophthalic acid and 5 grams of unsubstituted orthophthalic acid, together with 200 ml. of mixed petroleum xylenes (B.R. 136–144° C.) is heated at reflux for about two hours, and thereafter cooled to room temperature and filtered. The residue contains most of the original orthophthalic acid, while practically all of the chloro orthophthalic anhydride is dissolved in the filtrate. Further resolution of the 3 and 4-chloro orthophthalic acid anhydrides is not readily ac-

Example III

The oxidation of mixed trimethyl and tetramethyl benzene can ultimately lead to a mixture of 3-methyl orthophthalic acid, 4-methyl orthophthalic acid, and 3,6-dimethyl orthophthalic acid. The 3,6-dimethyl acid can be separated from the other two acids by heating in the presence of toluene. About 5 grams of 3,6-dimethyl orthophthalic acid, 5 grams of 3-methyl orthophthalic acid, and 5 grams of 4-methyl orthophthalic acid are heated in the presence of 200 ml. of refluxing toluene (B.P. 110.6° C.). After about two hours, the mixture is cooled to 25° C., and a filtrate containing most of the original 3,6-dimethyl orthophthalic acid in the form of its anhydride is separated from a fraction enriched in the 3-methyl and 4-methyl orthophthalic acids.

Example IV

The liquid phase oxidation of pseudocumene in the presence of a heavy metal oxidation catalyst and bromine gives trimellitic acid (4-carboxy orthophthalic acid) together with an amount of orthophthalic acid which is formed as a result of oxidizing o-ethyl toluene, a contaminant. A mixture of 5 grams of trimellitic acid, 5 grams of orthophthalic acid, and 100 cc. of p-cymene (B.P. 177° C.) is refluxed for 75 minutes, collecting the water which distills overhead. The suspension is filtered at the boiling point. The insoluble solids, consisting primarily of trimellitic acid, weigh 4.46 grams and have an acid number of 793. This represents an 83.5% recovery of trimellitic acid of 93.7 purity.

The filtrate is evaporated to 30 cc. volume, and upon cooling to 25° C. yields 4.05 grams of crystalline acids, predominantly orthophthalic acid anhydride. This has an acid number of 743, indicating a recovery of 79.3% of the orthophthalic acid as phthalic anhydride of 98% purity.

Example V

In an example similar to Example IV, except that the heating time is reduced from 75 minutes to 35 minutes, orthophthalic acid anhydride is separated from trimellitic acid. 5 grams of trimellitic acid, 5 grams of orthophthalic acid and 100 cc. of p-cymene (B.P. 177° C.) are heated at reflux for about 35 minutes, while collecting the water distilled overhead. The suspension is filtered at the boiling point. Solids, predominantly the trimellitic acid, weigh 6.79 grams and have an acid number of 755. Thus 64.2% of the orthophthalic acid is converted to phthalic anhydride.

The filtrate is evaporated to dryness, and leaves a residue of 2.1 grams of predominantly phthalic anhydride, the residue having an acid number of 754. Thus, essentially pure phthalic anhydride has been formed to the exclusion of trimellitic anhydride, since an acid number higher than 759 would be encountered if any trimellitic anhydride had in fact been formed.

Example VI

The oxidation of 1,2,4-trimethyl benzene (pseudocumene) gives a mixture which predominates in trimellitic acid, but contains some 4-methyl orthophthalic acid. To illustrate the separation of 4-methyl orthophthalic acid anhydride from trimellitic acid, 5 grams of 4-methyl orthophthalic acid, 5 grams of trimellitic acid, and 100 cc. of p-cymene (B.P. 177° C.) are heated at reflux for about one hour. The mixture is filtered hot and the filtrate evaporated to dryness. It is found that most of the 4-methyl orthophthalic acid is converted to the anhydride and is present in the extract, while substantially all of the trimellitic acid is retained as solids on the filter.

Example VII

The compound 4-t-butyl orthoxylene can be oxidized readily to the corresponding 4-t-butyl orthophthalic acid. However, many oxidation systems simultaneously attack the t-butyl group to some extent, and accordingly some trimellitic acid is formed. To illustrate the workup of such an oxidation reaction mixture, 101 grams of 4-t-butyl orthophthalic acid obtained from the heavy metal-bromine catalyzed air oxidation of 4-t-butyl orthoxylene is dissolved in 200 ml. boiling toluene (B.P. 110.6° C.). Almost immediately, a substantial amount of the 4-t-butyl orthophthalic acid dehydrates to the corresponding anhydride and dissolves in the toluene. The resultant suspension is filtered, leaving 2.5 grams of insoluble trimellitic acid (acid No. 754), and the residual solution is refluxed for an additional nine hours to assure complete dehydration.

The solution is distilled under vacuum to remove toluene, and 97.6 grams of crude 4-t-butyl orthophthalic acid anhydride is obtained.

The solid is dissolved in a hot n-heptane, and 3.1 grams of an amorphous gum is filtered off and discarded. On chilling the n-heptane, 81.4 grams of 4-t-butyl orthophthalic acid anhydride is obtained. This product has an acid number of 534 (theoretical acid number equals 550). By redistilling the mother liquor, an additional 5.0 grams of impure anhydride (acid No. 437.5) is recovered.

A 40 gram sample of the 81.4 gram anhydride crystals is distilled under 0.7 millimeter mercury absolute pressure. After removing a 4.5% forerun boiling below 120° C. and having an acid number of 437.3, an 87.0% heart cut distills at 120° C. and has an acid number of 550 (theory equals 550). This represents 75.2% recovery of the original 4-t-butyl orthophthalic acid in 100% purity.

In similar manner, other aromatic acid mixtures may be resolved. While the invention has been described with reference to mononuclear benzene carboxylic acid derivatives, it is evident that it may also be employed with the polynuclear acids, such as the naphthalene carboxylic acids, etc. It is only necessary to conduct a simple test such as that described previously for determining the characteristic dehydration temperatures of the individual acids so as to determine the feasibility and operating conditions for resolving mixtures of aromatic acids having adjacent carboxyl groups. Then, by heating the mixture to a temperature intermediate of the characteristic dehydration temperatures, resolution of the mixture can easily be effected.

While the invention has been described with reference to particular embodiments thereof, it is apparent that many modifications and variations will be apparent to those skilled in the art. Accordingly, it is intended to embrace all such modifications and variations as fall within the spirit and broad scope of the invention.

We claim:

1. A process for resolving a mixture of at least two aromatic polycarboxylic acids, each of said acids having two carboxyl groups sterically capable of forming an intramolecular anhydride and possessing characteristically different dehydration temperatures, said mixture being selected from the combinations of (a) 3-nitro orthophthalic acid and 4-nitro orthophthalic acid, (b) chloro orthophthalic acids and orthophthalic acid, (c) methyl orthophthalic acids and 3,6-dimethyl orthophthalic acids, (d) 4-carboxy orthophthalic acid and orthophthalic acid, (e) 4-carboxy orthophthalic acid and 4-methyl orthophthalic acid, and (f) 4-t-butyl orthophthalic acid and 4-carboxy orthophthalic acid, which process comprises heating said mixture in the presence of a refluxing aromatic hydrocarbon to a temperature intermediate of said individual dehydration temperatures for a period of time sufficient to dehydrate only one of said aromatic acids to the anhydride thereof while minimizing dehydration of the other of said aromatic acids, thereby forming a liquid fraction containing aromatic acid anhydride and aromatic hydrocarbon and a solid fraction comprising aromatic polycarboxylic acid, and thereafter separating the two fractions.

2. Process of claim 1 wherein said mixture is 3-nitro orthophthalic acid and 4-nitro orthophthalic acid.

3. Process of claim 1 wherein said mixture is chloro orthophthalic acids and orthophthalic acid.

4. Process of claim 1 wherein said mixture is 4-carboxy orthophthalic acid and orthophthalic acid.

5. Process of claim 1 wherein said mixture is 4-carboxy orthophthalic acid and 4-methyl orthophthalic acid.

6. Process of claim 1 wherein said mixture is 4-t-butyl orthophthalic acid and 4-carboxy orthophthalic acid.

References Cited in the file of this patent

UNITED STATES PATENTS

| | | |
|---|---|---|
| 2,092,795 | Beckett et al. | Sept. 14, 1937 |
| 2,511,861 | Marotta | June 20, 1950 |
| 2,529,448 | Conover | Nov. 7, 1950 |
| 3,007,942 | Burney et al. | Nov. 7, 1961 |

OTHER REFERENCES

Beilstein: Bd. IX, vierte auflage, pages 817, 819, 821–824 (1926).

Fieser et al.: Basic Organic Chemistry, page 110 (1959).